Patented July 14, 1931

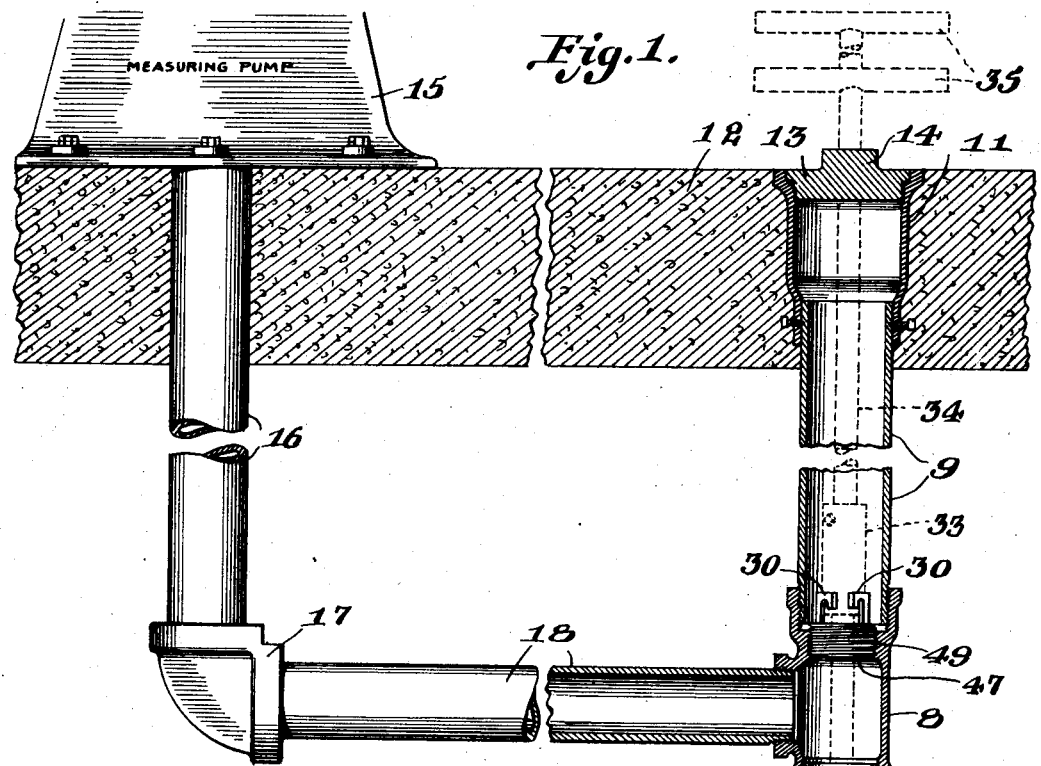

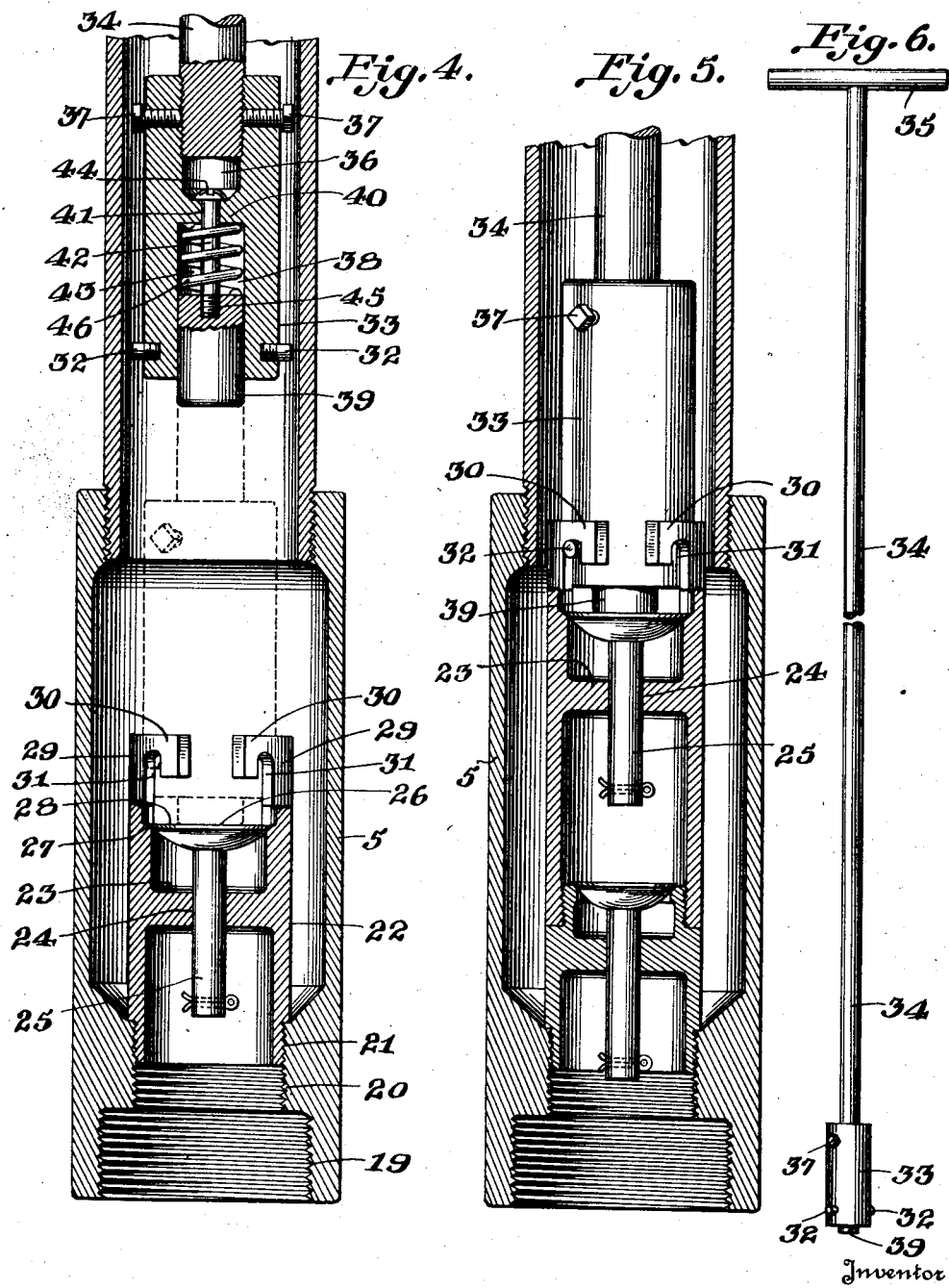

1,814,065

UNITED STATES PATENT OFFICE

ARTHUR THOMAS WAKEFIELD, OF BALTIMORE, MARYLAND, ASSIGNOR TO AMERICAN OIL COMPANY, OF BALTIMORE, MARYLAND

LIQUID MEASURING SYSTEM

Application filed December 29, 1926. Serial No. 157,855.

The invention forming the subject matter of this application is a system designed generally for the accurate measurement and dispensing of liquids from underground storage tanks; and more particularly for the accurate measurement and dispensing of gasoline and similar liquids in the apparatus used in filling stations.

In order for gasoline to be pumped properly from the underground tanks in common use at filling stations it is necessary to use what are known as "foot-valves" in the discharge line. The best location for these foot-valves is at the bottom of the suction line within the underground storage tank. The great drawback to such positioning of foot-valves such as are in use at the present time is that when these valves get out of order, as they sometimes do, it is necessary to dig up the concrete or ground in which the tank is embedded and get down into the tank in order to make the necessary repairs. Either this or a large opening must be provided from the tank up to the ground level and all around the suction line and a large manhole has to be placed over the surface opening. This method of repair is very costly since it ties up the use of the system, and involves not only the breaking of concrete, but of all pipe-lines leading to the pump, with the incident loss of gasoline etc.

It is the main object of this invention to construct the piping and valve mechanism of such system between the underground storage tank and the measuring pump so as to avoid all necessity for breaking the ground or the piping in order to effect repairs in the dispensing mechanism.

A further and most important object of this invention, is to provide the discharge line leading from the tank to the measuring pump with means to ensure accurate measurement of the liquid drawn from the tank to the measuring pump.

A still further object of the invention is to provide systems of this type with valves and other parts constructed so as to be readily inserted in locked and operative positions in the discharge line and to be removed therefrom by means of a key constructed specially to effect such insertion and removal.

Other objects of the invention will appear as the detailed description of the invention proceeds.

In the accompanying drawings:

Fig. 1 is a sectional elevation of a liquid measuring and dispensing system embodying this invention;

Fig. 2 is an elevation of a plug of special construction used in the discharge line of the said system;

Fig. 3 is a plan of said plug;

Fig. 4 is a longitudinal vertical section of one form of valve mechanism used in this system and of a key constructed to cooperate with parts of said mechanism to facilitate the insertion and removal thereof from the discharge line of the system;

Fig. 5 is a similar view of a modified form of the valve mechanism and of the said key in elevation and in operative engagement with said mechanism; and Figure 6 is an elevation of said key.

As shown in the drawings the underground storage tank 1 is provided with an aperture 2 over which is seated and fixed thereto, an internally screw threaded bushing 3 adapted to receive the externally screwthreaded sleeve 4.

The opening 2 is large enough to permit the passage therethrough of a valve casing 5 which is positioned with its lower end adjacent the bottom of the tank 1. The upper end of the valve casing 5 is supported from and in screwthreaded connection with a pipe 6, passing through the aperture 7 of sleeve 4 and secured to said sleeve with a gas tight fit in any suitable manner. A T-joint 8 connects the pipe 6 with a second pipe 9 in alinement with pipe 6 and forming therewith a passageway to provide for the insertion and removal of the valve mechanism with the valve casing 5.

The upper part of pipe 9 is suitably secured, as by set-screws, to a cylindrical casing 11 which is embedded in the concrete 12 and is internally screwthreaded at its upper end to receive an externally screwthreaded plug 13, having a squared projection 14, on its upper face adapted to be engaged by a wrench or key to facilitate insertion in or removal from casing 11.

The measuring pump 15, seated on the concrete 12 is offset from the pipes 6 and 9, and is connected to the T-joint 8 by means of the vertical pipe 16, elbow 17, and horizontal pipe 18, all connected to each other in liquid and gas tight fit in any suitable manner.

The valve mechanism used in this invention comprises the casing 5, having a screwthreaded cylindrical recess 19 at its lowest end adapted to receive a filtering device (not shown). This casing 5 is further provided with an internally screwthreaded bore 20 to receive the lower externally screwthreaded end 21 of the valve cylinder 22, which is provided centrally thereof with a partition 23 having an aperture 24 therethrough to serve as a guide for the stem 25 of the poppet valve 26. The cylinder 22 has a bevel seat 27 for the correspondingly bevelled edge 28 of the head valve 26, and is extended beyond said seat and head to form two diametrically disposed lugs 29, each of which has two arms 30 extending laterally on opposite sides from its lug 29 and curved downwardly toward the valve seat 27 to form recesses 31 adapted to receive the pins 32 formed on the plunger casing 33 of a key wrench K.

The key wrench comprises the rod 34, long enough to extend from above the ground level to the bottom of tank 1, screwthreaded into the casing 33, and a handle 35 to facilitate turning of the wrench The upper end of the casing 33 is bored to form a recess 36 having a part thereof screwthreaded to receive the screw threads of rod 34, and set bolts 37 are screwthreaded radially through said casing 33 to lock the rod 34 rigidly to the casing 33 when the two are properly connected to each other The casing 33 is also provided with a plunger receiving recess 38 in which the plunger 39 is slidably mounted Separating the recesses 36 and 38 is a partition 40 having a central aperture 41 in which the shank 42 of a headed machine screw 43 is mounted to slide The head 44 of this screw is positioned in the recess 36, while its shank 42 extends into recess 38 and has its end 45 screwthreaded into the upper end of plunger. A spring 46 interposed between the inner end of plunger 39 and the lower face of partition 40 serves to keep the plunger 39 normally projected from the casing 33.

The plunger casing 33 is adapted to slide with neat fit between the diametrically opposed lugs 29, and the arms 30 of opposite lugs 29 are spaced apart to permit the passage therebetween of the pins 32 on casing 33. These pins 32 are designed to seat in the recesses 31 and to be held yieldingly therein by the engagement of the plunger 39 with the top of valve 26. This locking engagement of cylinder 33 with lugs 29 is shown clearly in dotted lines in Fig. 4 and in full lines in Fig. 5 where the plunger casing is shown positioned at the end of a valve seating operation. For valve removing purposes the key K is merely pressed downwardly against the yielding resistance of plunger 39 and is turned from the position shown in Figure 5 until pin 32 contacts with the edge of the right hand lug 29; then, the downward pressure on handle 35 is released and the spring 46 forces the casing upwardly until pins 32 engage the upper edges of the recesses 31. The key is then positioned to turn in the opposite direction to remove the valve mechanism as a whole from the casing 5.

The structural details of the modification shown in Fig. 5 are quite similar to those shown in Fig. 4 except that poppet valves are shown in tandem in Fig. 5. The operation of these valves will be obvious from inspection of the drawings and need not be described in detail here.

The plug 47 (Figs. 1, 2 and 3) is the most important element of this liquid measuring system. This plug is provided with lugs 29, arms 30, and recesses 31, identical with those shown in Figs. 4 and 5 on the valve mechanisms; in order that the plug may be inserted in and removed from its operative position shown in Fig. 1. If nothing more than the mere withdrawal of liquid from tank 1 were involved this plug could be omitted; but, where the liquid is to be withdrawn in measured quantities, this plug is absolutely essential. This plug 47 has a solid externally screwthreaded part 48 adapted to be screwed into the internally screw-threaded section 49 of the T-joint 8 until the bottom of the plug is flush with the top of the horizontal pipe 18.

When plug 47 is properly seated in T-joint 8 the discharge line from the tank 1 to the measuring pump 15 is filled with liquid and there are no vapor-forming pressure-varying pockets in the line to affect the measuring functions of the pump. Without this plug, the pipe 9, above the horizontal pipe 18 forms a large air and vapor trap in which the pressure varies so greatly that it is impossible to maintain the pump 15 in such condition that it can be depended upon for measuring purposes.

The assembling and disassembling operations of the plug and valve mechanisms by the key will be obvious from inspection of the drawings.

What I claim is:

In an underground tank adapted for the discharge of its contents by fluid pressure, a filler pipe extending substantially vertically from said tank to the ground level, a lateral discharge pipe communicating with said filling pipe at an intermediate part, fittings screwing into said pipe at depths inaccessible to hand operation, one below and one above said discharge pipe, the lower fitting having a check valve and the upper being an imperforate plug, a surface cap closing the upper end of said filling pipe, relative to which said plug is independent, said plug and check valve fitting having similar key engaging means by which they may be engaged and unscrewed successively by the same key.

In testimony whereof I affix my signature.

ARTHUR THOMAS WAKEFIELD.